United States Patent [19]

Etessam

[11] 3,925,981

[45] Dec. 16, 1975

[54] GAS GENERATOR

[76] Inventor: Alexander Hossen Etessam, 91 Eldorado Ave., Shemiran, Tehran, Iran

[22] Filed: June 24, 1974

[21] Appl. No.: 482,664

[52] U.S. Cl. .................... 60/39.77; 60/248; 60/269
[51] Int. Cl.² ..... F02K 7/02; F02K 7/04; F02K 7/06
[58] Field of Search ............ 60/247, 248, 249, 269, 60/39.76, 39.77, 39.52; 431/115, 116

[56] References Cited
UNITED STATES PATENTS

| | | | |
|---|---|---|---|
| 2,523,308 | 9/1950 | Kemmer | 60/248 |
| 3,680,317 | 8/1972 | Kotoc | 60/269 |
| 3,774,398 | 11/1973 | Etessam | 60/248 |
| 3,782,111 | 1/1974 | Kotoc | 60/269 |
| 3,824,787 | 7/1924 | Etessam | 60/248 |

*Primary Examiner*—C. J. Husar
*Assistant Examiner*—L. J. Casaregola
*Attorney, Agent, or Firm*—Kenyon & Kenyon Reilly Carr & Chapin

[57] ABSTRACT

A gas generator for a simulated gas turbine engine and an engine containing such a gas generator and having a subsonic and supersonic capability. The gas generator includes a pulse jet unit or a pair of alternately operating annular combustion chambers which may be valved or valveless. The exhaust gasses are given a helico-toroidal flow sucking in and accelerating intake air. The combined stream is divided and the circulating air stream is diffused and passed to the combustion chamber inlet. A helico-toroidal gas flow is also utilised to accelerate by-pass air.

22 Claims, 6 Drawing Figures

GAS GENERATOR

FIELD OF THE INVENTION

The present invention relates to a gas generator and more particularly to a gas generator for a simulated gas turbine engine and includes such an engine.

PRIOR ART AND OBJECT

The disadvantages of a gas turbine engine lies in the weight and complexity of the turbomachinery. A lot of this weight and complexity can be avoided by utilising the ram jet or pulse jet systems. However, the ram jet can only operate once a very high air speed has been established and a ram jet has the disadvantages of intermittent operation and the necessity for a tail pipe for scavenging purposes. I have made earlier proposals in U.S. Pat. Nos. 3,824,787 and 3,774,398 in which many of the disadvantages of pulse engines are avoided by using a pair of combustion chambers side by side and operating in pulses in alternate sequence so that the ignition cycle in one chamber creates a reduced pressure in the other chamber thereby assisting the air intake. This principle is adopted in the present invention and disclosures of the said applications are incorporated herein by way of reference for further details of the alternate operation of such combustion chamber pairs. The advantage of this system is that there is substantially continuous throughput of gas and no individual scavenging means is required for the combustion chambers. The earlier of the aforementioned applications described a combustion chamber system utilising air inlet valves and the second utilises a vortex in the intake air stream to provide a valveless air intake system. Other valveness air intake systems for pulse jets have been devised in the past and the gas generator of the present invention may utilise a valve system or a valveless system as will become apparent.

My earlier proposals have the disadvantages over a gas turbine engine in that since no utilisation is made of the energy in the exhaust gasses for compressing the air at the inlet of the combustion chambers, a lower ceiling is imposed upon the static pressure at the inlet to the combustion chambers and consequently upon the combustion efficiency of the gas generators.

The object of the present invention is to provide a gas generator in which gas turbine operation is simulated, in other words in which energy in the exhaust gasses is utilised to increase the static air pressure at the inlet of the combustion chambers, and in which the use of turbomachinary is eliminated. Thus not only is turbomachinary heavy, but it is also extremely delicate, complicated and expensive and requires very careful maintenance for safety reasons. Another important objection to gas turbines is that the necessity of turbine blades limits the maximum turbine inlet temperature which is very undesirable for obtaining low specific fuel consumption. All of these difficulties inherent in the use of turbomachinary are avoided in the present invention.

SUMMARY OF THE INVENTION

In the present invention the energy released by combustion is transferred to a mass of inlet air without the intermediary of turbomachinary.

According to one form of the invention, there is provided a gas generator comprising:

a plurality of annular combustion chambers arranged in at least one pair disposed on a common central axis, the combustion chambers of each pair being of the same volume, co-extensive and adjacent, having air inlets and exhaust outlets, a common annular air inlet passage leading to said air inlets of the combustion chambers of each said pair, a primary exhaust passage leading commonly from the exhaust outlets of the combustion chambers of each said pair, an exhaust duct communicating with said exhaust passage, fuel injection means and ignition means for each combustion chamber, means for operating at least one of said fuel injection means and ignition means of each pair of combustion chambers alternately at least during start-up whereby the paired combustion chambers operate in an alternate cycle, an air intake passage, means for transferring energy from high velocity exhaust gasses emitting by each pair of combustion chambers to cooler, lower velocity gas from said air intake passage so as to establish a combined gas stream of resultant energy, a secondary exhaust passage, means for separating part of said combined stream consisting substantially of combustion products into said secondary exhaust passage, a diffuser for collecting and diffusing part of said combined stream consisting substantially of air and conducting it to said air inlet passage of a said pair of combustion chambers whereby each air inlet passage receives high pressure air from a said diffuser means, said combustion chambers of each pair converging directly and without individual scavenging means into said primary exhaust passage in the form of mutually inductive nozzles whereby the combustion chambers operate in pulses in alternate sequence with the ignition cycle in one chamber creating a reduced pressure in the other chamber thereby assisting the air intake.

While the combustion chambers may contain an inlet valve, it is preferred to use valveless air inlets and in the preferred embodiment to be described the combustion chambers are shaped with a taper towards the exhaust outlet and a sharply expanded region near the inlet which restricts reverse flow of combustion products.

Valved combustion chambers will not be described in detail in the specification since the arrangement of such valves is well known and described in the case of similarly arranged annular adjacent combustion chambers in my aforementioned application Ser. No. 187,612.

The energy transfer means preferably includes means for establishing a helico-toroidal gas flow into which intake air is drawn and accelerated by the exhaust gasses from said combustion chamber pair; it preferably includes means for directing the exhaust gasses helico-toroidally outwardly of said intake air downstream of the entry of said air to said gas flow so as to form a part-toroidal gas/air interface whereby the intake air is drawn in and pressure exchange takes place and the gas and air streams tend to equalize in velocity.

Preferably the energy transfer means includes an annular enclosure adjacent the exhaust passage of each combustion chamber pair, coaxial with the combustion chambers and part of which is generally co-extensive with the exterior wall of said exhaust passage and a closed toroid supported within said annular enclosure forming with said enclosure a toroidal chamber in which said helico-toroidal gas flow is established.

The toroidal chamber may include a circulating air-/exhaust gas pressure-exchange zone adjacent and exhaust passage and a circulating gas/intake air mixing zone in a portion of the toroidal chamber angularly separated from said pressure exchange zone with respect to the toroid generatrix.

The gas generator may have a single pair of combustion chambers and a single toroidal chamber, said diffuser leading to the inlet passage of the said single pair of combustion chambers.

Alternatively, a gas generator may include a plurality of units each comprising a combustion chamber pair and toroidal chambers arranged with axial separation on said common axis, with a common air intake zone and exhaust duct.

Especially where a valveless air intake system is used, it is preferred to include an oscillation suppression chamber located between said primary exhaust passage and said toroidal chamber.

A preferred simulated gas turbine engine of the invention will include a by-pass air duct and means for transferring energy from secondary exhaust gas in said secondary exhaust passage to accelerate said by-pass air and to provide a combined air/gas exhaust stream of increased mass flow.

Such energy transfer means preferably include means for directing said by-pass air into a helico-toroidal flow and means for directing said secondary exhaust gas helico-toroidally outwardly of said by-pass air downstream of said by-pass air directing means whereby the intake air is drawn in and pressure exchange takes place and the gas and air means tend to equalize in velocity.

An after burner may be included upstream of the exhaust nozzle.

The advantages of the present invention mainly accrue from the absence of turbomachinary and may be summarised as follows:
1. Greater simplicity.
2. Light weight.
3. Greater safety.
4. Considerable improvement in thrust and power to weight ratio.
5. Low specific fuel consumption due to utilisation of higher temperatures.
6. Longer life due to absence of turbine blades and rotating parts.
7. Greater ease of maintenance due to absence of rotating parts.
8. Considerable reduction in manufacturing cost.
9. Considerably easier and faster to overhaul.
10. Relatively longer period between overhauls.

BRIEF DESCRIPTION OF THE DRAWINGS

Reference is now made to the accompanying drawings which illustrate embodiments of the invention in partly diagrammatic form, and in which.

DETAILED DESCRIPTION OF EMBODIMENTS

Figure 1:
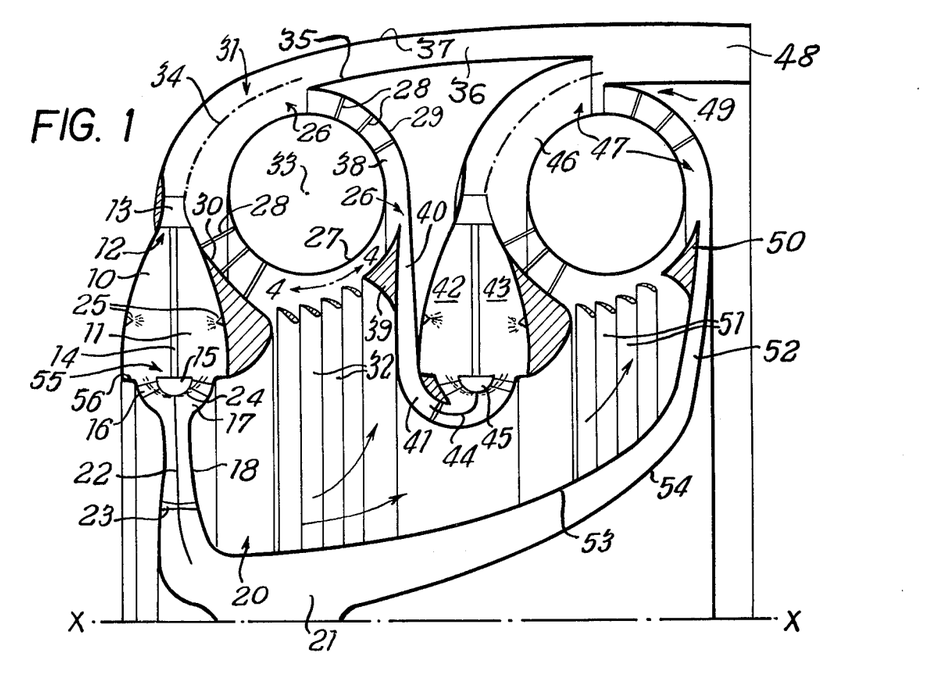
FIG. 1 is a part radial sectional view of a double unit gas generator of the invention.
Figure 3A:
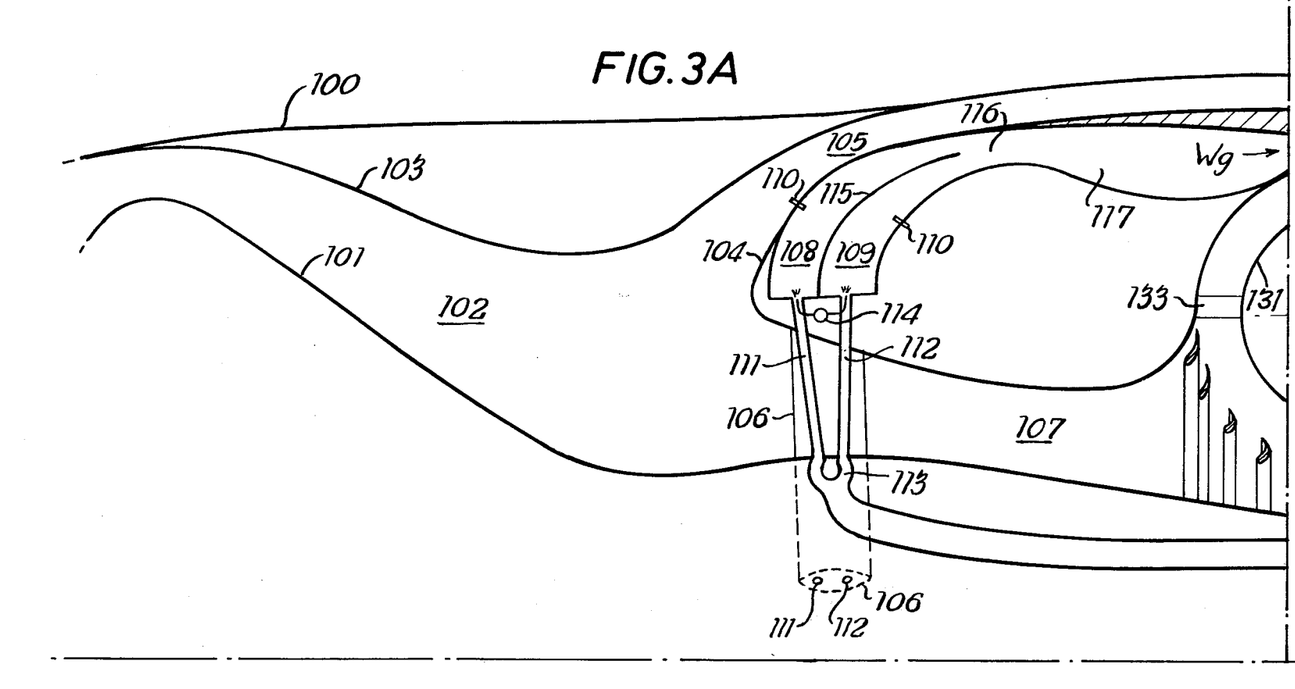
FIGS. 3a and 3b constitute a continuous view similar to FIG. 1 of a simulated gas turbine engine having subsonic and supersonic capability.
Figure 3B:
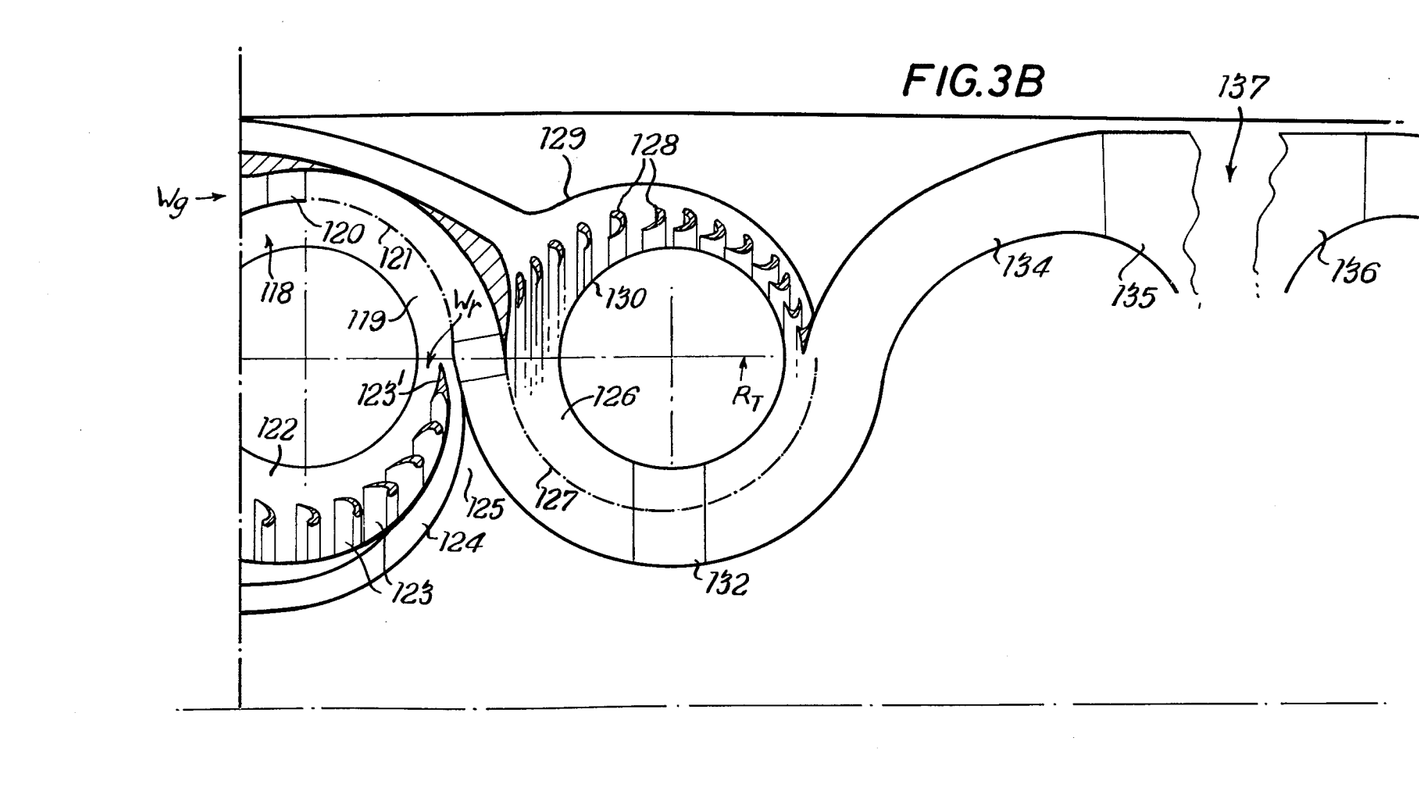

In FIGS. 1 and 3, since the axis X—X of the gas generator forms an axis of symmetry, only part of the complete radial section is shown.

Figure 2:
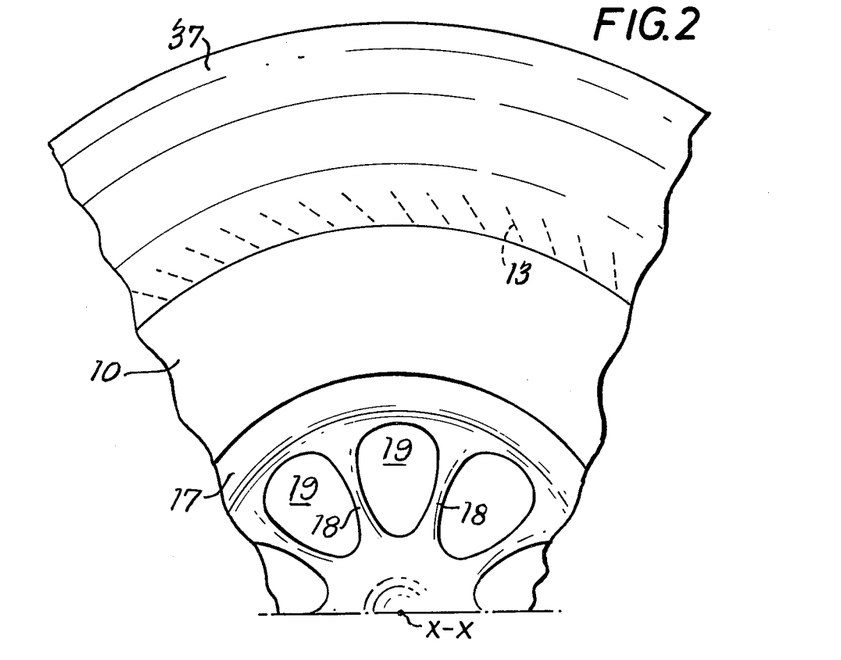
FIG. 2 is a part elevational view of the embodiment of FIG. 1 viewed towards the air inlet.

In FIGS. 1 and 2 the gas generator comprises a pair of annular, radially extending adjacent and complementary combustion chambers 10, 11 which converge into a common exhaust outlet 12 in which is situated an array of stator blades 13 which give a spin component to the exhaust gasses about the axis X—X. Separating the combustion chambers is a circular divider structure 14 which is supported between the array of stator blades 13 and a hub 15 which may in turn be supported by a vane structure 16. The divider 14 may contain one or more bleed passages leading through cooling air from the air-intake.

Air inlets in the form of annular slot-like ducts 16, 17 lead into respective combustion chambers from an arrangement of spoke-shaped ducts 18 which have spaces 19 in between to allow passage of intake air into the interior air-intake zone indicated at 20. The spoke-shaped ducts 18 connect with a common central air inlet passage 21 and the spoke-shaped ducts 18 may be divided into respective passage to each air inlet by a central divider 22 which may be supported by struts 23. The fuel is transmitted through the hub 15 by means of nozzles 24. Means are provided for synchronising one or both of the ignition means or fuel injection means at least during start-up so as to provide alternate explosions in the combustion chambers.

The hot exhaust gasses from the combustion chambers 10, 11 lead into the toroidal chamber 26. The central boundary of the annular chamber 26 is formed from a toroidal structure 27 which may be supported as shown by stator blades 28 on exterior casing portions 29, 30. The top left-hand quadrant of the toroidal chamber 26, shown at 31 constitutes a pressure exchange zone where the exhaust gasses are directed radially outwardly of a circulating flow of intake air entering upstream of the exhaust gasses with respect to the toroid generatrix, from the air intake zone 20, through an assembly of stator blades 32. The stator blades 32 are annular or ring shaped to form part of the outer boundary of the toroidal chamber 26 at the inner region nearest to the axis X—X. As shown in FIG. 1 they are of aerofoil section and their trailing edges are progressively further removed from the toroid generatrix 33 in the clockwise direction which is the direction of air-flow about this generatrix. The stator blades 32 are angled to direct the incoming air clockwise as shown and also to impart to this air a component about the axis X— X so that the resultant air stream is what is referred to in this specification as helico-toroidal which is to say that it has a component about the toroid generatrix 33 and also about the axis of the toroid, X—X. The blades 32 are supported e.g. by struts.

The circulating air-flow meets the exhaust gasses along the chain dotted boundary line marked 4—4. At this boundary line there is a pressure exchange between the exhaust gasses and the circulating air, the circulating air stream being dragged by viscous flow and accelerated in the pressure exchange zone 31. This acceleration of circulating air flow causes a reduction in pressure upstream or in other words the intake air is drawn in between the stator blades 32 and accelerated so that at the end of the pressure exchange zone the exhaust gasses and circulating air are at approximately the same velocity and form a combined stream. It is important to note that there is substantially no mixing of the exhaust gasses with the intake air drawn in. There is of course some marginal mixing at the interface due to eddy currents which progressively enlarge downstream; air is ducted out together with exhaust gas.

At the downstream end of the pressure exchange zone, that is roughly at the 12 O'clock position in respect of the toroidal chamber, the combined stream is divided by means of a divider structure including the component 29 and a component 35 so that the exhaust gasses pass on into a secondary exhaust passage 36 defined between the structural member 35 and the outer casing member 37.

Part of the combined stream which is virtually pure air is recirculated in a section of the toroidal chamber 36 indicated at 38. The circulating air stream is again divided at approximately the 3 O'clock position in FIG. 1 by a structural casing member 39. At this point part of the circulating air continues around the torus and mixes with the intaken air passing in between the stator blades 32. At the position of the dividing member 39, the toroidal chamber 36 is at its narrowest and only a small part of the air is recirculated. The remainder passes between the members 29 and 39 into an annular diffuser 40. This in turn leads to the inlet zone 41 of a second pair of combustion chambers respectively numbered 42, 43 which can be substantially identical with the combustion chambers 10, 11 and therefore need only a brief description. Virtually the only difference lies in the shape of the inlet zone 41 and the central dividing member 44 leading from the hub 45 which are a different, curved shaped corresponding to the end of the diffuser 40.

The exhaust gasses from the second pair of combustion chambers 42, 43 pass to the pressure exchange zone 46 of a second toroidal chamber which is virtually identical to the toroidal chamber 26. At the end of the pressure exchange zone 46, the exhaust gasses are divided from the recirculating air and enter a tertiary exhaust passage 48 where these exhaust gasses are mixed with the gasses from the secondary exhaust passage 36. A casing member forming a division is marked 49.

Again at approximately the 3 O'clock position, the circulating air is divided by a dividing structure 50. A circulating air portion mixes with further intake air from the intake zone 20 which passes in between an array of stator blades 51 similar to the blades 32. The remainder of the air enters a second diffuser 52 which leads to the air inlet zone 21 of the first pair of combustion chambers 10, 11. The radially outward boundary 53 of the diffuser 52 forms the axial boundary of the air inlet zone 20 and the other boundary of the diffuser 52, marked 54 is constituted by a conically shaped casing member.

Thus in operation the incoming air intake stream is accelerated to the velocity of the hot exhaust gasses also gaining in heat and the majority of it is diffused to increase the static pressure before reaching the inlet of a pair of combustion chambers. Only a small fraction of the air is recirculated and this fraction is constant so that in essence all of the intake air is increased in energy before arriving at the combustion chambers, resulting in very high thermal efficiency in the combustion chambers. The component of spin about the axis X—X results in a smoother flow, facilitates the entry of fresh air and increases the effective path length of the circulating gasses giving greater time for acceleration.

Returning to the combustion chambers 10, 11, it will be observed that the hub is shaped with a sharp shoulder portion 55 on the interior side of the air inlet 16 and that also the outer boundary of each combustion chamber is formed with a sharp shoulder 56. The shoulders 55, 66 form an enlarged "dead water" region around and on the inside of the air inlet 16 which essentially directs the combustion gasses towards the nozzle. Such gasses as do escape down the inlet are dissipated in the portion of the passage adjacent the central air intake zone passage 22 and in doing so encourage entry of inlet air into the alternate combustion chamber which at the time of the explosion in the one combustion chamber is in its intake cycle. Thus the use of alternately operating combustion chambers are described obviates the need for a valve system at the air intake but of course one may be provided if desired so that the combustion chambers operate like those described in the said Application Ser. No. 290,740 i.e. similarly to pulse jets except that no individual scavenging means such as a tail pipe is employed. The exhaust gasses from one of the combustion chambers provide a reduced pressure in the opposite chamber encouraging the intake of fresh air through the inlet. In this way tail pipe scavenging means are obviated as described in my aforementioned Patent Application.

While some control of the ignition and/or the fuel injection cycle is necessary during start-up, this will not be necessary during continued operation of the gas generator since alternate operation in pulses will be naturally induced. The fuel may continue to be injected in pulses for reasons of economy but this is not necessary and the ignition means may be switched off altogether since the residual heat in the combustion chamber will be sufficient to cause the subsequent explosion. Since the combustion chambers operate alternately there will be almost continuous throughput of exhaust gas through the exhaust passage with comparatively little irregularity of flow. Nevertheless an oscillation suppression chamber may be provided as shown for example in the embodiment to be described in connection with FIG. 3.

FIG. 3 shows in radial section part of the nacelle of a simulated gas turbine engine capable of subsonic and supersonic use or alternately part of a missile. The section, like FIG. 1, is symmetrical about the central axis X—X. The outer casing of the nacelle is shown at 100. Casing portion 101 defines a supersonic inlet zone and the interior of an annular air inlet passage 102, the outer boundary of which is formed by casing member 103. An interior casing portion 104 divides the annular intake air stream into a by-pass stream in duct 105 and main air intake which passes between supporting aerofoil spokes 106 (shown in section in dotted lines) into the main air intake zone 107. The combustion chambers 108, 109 are curved in shape and have their inlet and outlets axially as well as radially separated unlike those of FIG. 1. Otherwise their operation is substantially the same. Ignition means are indicated at 110 which may be spark or glow ignitors. Individual air intake pipes 111, 112 are provided in the aerofoil spokes 106, leading to a common annular air intake region 113. A fuel pipe is shown at 114 leading to the air inlet ducts 111, 112.

Although not shown, bleed air is preferably conducted through the central divider 115 between the combustion chambers and around the interior surface 116 of the interior combustion chamber. If necessary heat insulating material is provided on the casing portion 104 constituting the outer boundary of the combustion chamber pair. The exhaust outlet 116 of the combustion chamber pair leads into an oscillation suppression chamber 117, the purpose of which is to damp down oscillations and to act as a reservoir chamber which assists the operation of the valveless air intake. The outlet of the oscillation suppression chamber 117 leads into a toroidal chamber 118 which is generally similar to the toroidal chambers 26, 47 of FIG. 1. The pressure exchange zone is shown at 119 and the stator blade assembly at 120 again imparts a helico-toroidal flow to the exhaust gasses which meet incoming circulating air along the chain dotted boundary 121.

The intake air from the intake zone 107 passes into the toroidal chamber 118 at the mixing zone 122 through a assembly of stator blades 123 which are more extensive than the array in FIG. 1, since there is no section in this toroidal chamber 118 corresponding to the section 38. Thus the mixing zone 122 extends upstream as far as the division of the combined flow separating off the exhaust gasses which is at approximately 3 O'clock, the exhaust gasses having entered at 12 O'clock. The endmost stator blade 123 forms the separating means dividing off the circulating air flow which passes to a diffuser 124 which in turn communicates with the air inlet zone 113 of the combustion chambers.

The combined flow at the 3 O'clock position is further divided off by a casing structure 125 whereby the exhaust gasses together with some air pass directly into a second toroidal chamber 126 for the purpose of accelerating by-pass air from the by-pass passage 105.

In the toroidal chamber 126, the exhaust gasses travel anti-clockwise from a pressure exchange interface 127 with the by-pass air, which enters through the stator blade array 128. The blades 128 are supported on the outside of the torus and from the toroidal casing portion 129 and extend over nearly 180°C around the toroidal interior casing structure which is indicated at 130.

The interior toroidal casings 130 and 131 may be supported at convenient positions by vanes or stator blade assemblies e.g. as shown at 132 and 133. These are shown mainly for diagrammatic purposes and it will be appreciated that additional supporting means may be provided if necessary. The exhaust gasses entering the toroidal chamber 126 accelerate the by-pass air in a similar manner to the acceleration of the intake air in the main toroidal chamber 118. The combined gas flow passes through an exhaust outlet passage 134 through a straightener blade assembly 135 and ultimately through an outlet nozzle the beginning of which is indicated at 136. An after burner unit of conventional type is generally indicated at 137 and may be used if desired. Since this is conventional it will not be described further.

The blades 123 and 128 may be supported by struts (not shown) like the blades 32.

The following discussion of theoretical operational factors may be of utility in further understanding the invention and the ideal potential efficiencies and temperatures which may be obtained.

THEORETICAL CONSIDERATIONS

Figure 4:
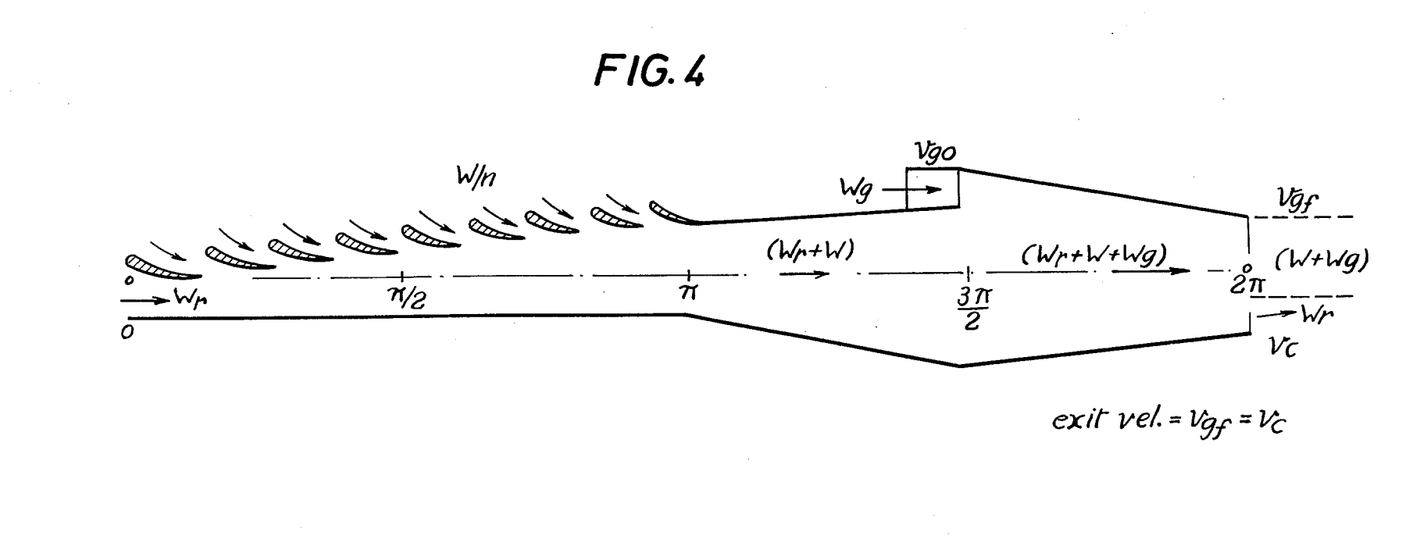
FIG. 4 is a diagrammatic section of part of a toroidal chamber taken along the lines 4—4 of FIG. 1.
Figure 5:
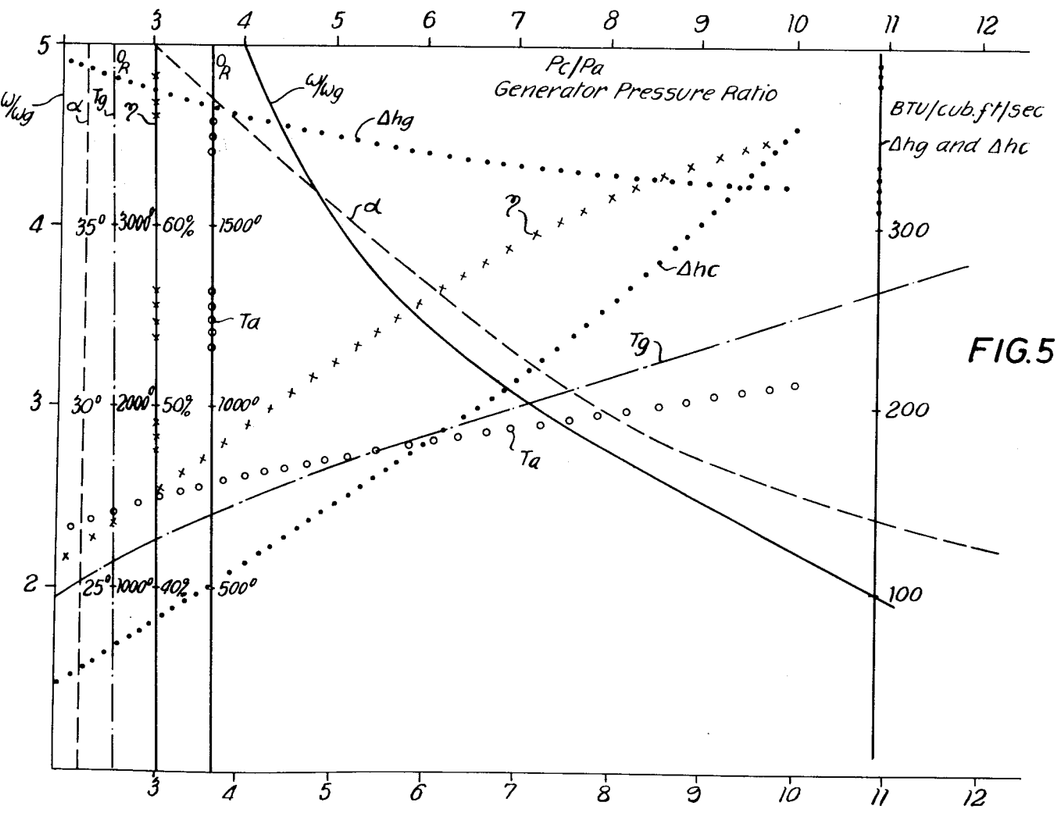
FIG. 5 is a series of graphs of various functions plotted against the pressure ratio Pc/Pa in an ideal engine of the invention.

The following symbols are used in the discussion which follows and in FIGS. 4 and 5.

Symbols $W$ = Air flow lb/sec
$Wg$ = Gas flow rate lb/sec
$Wr$ = Recirculation flow rate lb/sec
$\Delta hg$ = Combustion energy transferred BTU/lb of gas flow
$\Delta hc$ = Energy transferred to air BTU/lb air flow
$\Delta hi$ = Energy transferred to inlet air from the energy content of recirculation air BTU/lb of air
$\eta g$ = Gas energy transfer efficiency
$\eta c$ = Energy transfer efficiency for air
$fa$ = Fuel-air ratio
$Pc$ = Diffuser outlet pressure
$Pa$ or $Pi$ = Inlet pressure
$\gamma c$ = Compression pressure ratio
$Vg$ = Exhaust gas velocity ft/sec
$Vgo$ = Exhaust gas velocity at exit of combustion chambers
$Vgf$ = Exhaust gas velocity at the end of pressure exchange
$Vc$ = Circulating air velocity
$Tg$ = Generator exit temperature °R
$Ta$ = Combustor air inlet temperature °R

THE PRESSURE AND HEAT EXCHANGE

The invention provides a double flow system which involves transferring energy from hot combustion products ejected from a blade nozzle ring (the primary flow) to the air mass flow (the secondary flow).

The designation of secondary flow is accordingly applied to the air vortex flowing around the torus thus forming an interface with the primary flow. The energy received by the secondary flow is that which is transferred to it by the primary flow. The transfer of energy takes place by pressure exchange and velocities on the sides of the interface separating the two flows become equal.

In combining of two parallel flows differing greatly in their initial temperature at the merging point the dominant entropy rise is that which is associated with the transfer of heat between the two streams; however, the entropy rise produced by the viscous dissipation of kinetic energy associated with any residual nonuniformity of the velocity in the pressure exchange process can be considered negligible. Accordingly the pressures and velocities of the two flows are substantially equalised at the interface and the process is essentially reduced to a heat transfer process.

Some mixing of gas and air takes place at the interface due to eddy current which is small at the beginning and gradually increases to an extent which depends on the length of the flow path. The result of the pressure exchange process is redistribution of energy released by combustion over a comparatively large mass of air, a portion of which is utilised to feed the combustors at an increased pressure after passing through a diffuser.

THE RECIRCULATION VORTEX FLOW

At the end of the pressure exchange process the gas plus a comparatively large mass of air partially mixed with gas at the vicinity of the interface is ducted out of the gas generator unit to produce the required thrust or power output.

From the rest of the air mass flow a quantity of air is led through a diffuser to feed the combustors at a pressure $Pc$ higher than the inlet pressure $Pi$. The balance of air mass $Wr$ continues to circulate around the torus. After the induction process is completed the mass flow rate of the recirculation air $Wr$ increases to $(Wr + W)$.

In this process the total energy available in the air mass $Wr$ does not change; however the energy per lb of air drops from the original value $\Delta hc$ to $\Delta hi$ due to increased mass at the end of inlet air induction process.

The energy content of the recirculation air mass $Wr$ before induction $= Wr (\Delta hc)$ The energy after induction $= (Wr + W)(\Delta hi)$ Since the total energy remains unchanged, therefore:
$$Wr \Delta hc = (Wr + W) \Delta hi$$

$$\frac{\Delta hc}{\Delta hi} = \left(1 + \frac{W}{Wr}\right)$$

$$\frac{W}{Wr} = \left(\frac{\Delta hc}{\Delta hi} - 1\right)$$

Therefore air mass induction $W$ is given by the following equation:

$$W = Wr \left(\frac{\Delta hc}{\Delta hi} - 1\right)$$

Subsequent to the induction process the flow path area increases until it reaches the gas and air merging station; at this point the gas ejecting from the nozzle accelerates the air flow and pressure exchange takes place. Then the combined mass of gas and air has a maximum flow path area and therefore maximum static pressure. The area of the combined flow path thereafter gradually reduces until it reaches the outlet duct.

The energy content of the air prior to energy transfer is $\Delta hi$ and after the energy transfer the energy content of the air is $\Delta hc$ so that energy transferred to one lb. of air is $(\Delta hc - \Delta hi)$.

In order to allow for the losses involved in the energy transfer process efficiencies $\eta_c$ and $\eta_g$ are assigned to the gas and air flow respectively.

The total energy transferred from the gas stream $= (1 + fa) Wg . \Delta hg$

The total energy transferred to air is: $(Wr + W)(\Delta hc - \Delta hi)$

Therefore $$\eta_g (1 + fa) Wg . \Delta hg = (Wr + W) \frac{\Delta hc - \Delta hi}{\eta_c}$$

$$\eta_c \eta_g (1 + fa) Wg . \Delta hg = Wr(\Delta hc - \Delta hi) + W(\Delta hc - \Delta hi)$$

$$= W \Delta hi + W \Delta hc - W \Delta hi$$

$$= W . \Delta hc \text{ (since } Wr(\Delta hc - \Delta hi) = W \Delta hi\text{)}$$

$$\frac{W}{Wg} = \eta_c \eta_g (1 + fa) \frac{\Delta hg}{\Delta hc}$$

$$\frac{hg}{hc} = \frac{W/Wg}{\eta_c \eta_g (1 + fa)}$$

$$\Delta hc = \frac{\Delta hg \eta_c \eta_g (1 + fa)}{W/Wg}$$

The inlet air gains energy in two stages. It first obtains energy $\Delta hi$ from the recirculation flow and then $(\Delta hc - \Delta hi)$ from the gas energy transfer process so that the total energy transfer per pound of air is $\Delta hi + (\Delta hc - \Delta hi) = \Delta hc$ The foregoing process is a simulation of gas turbine operation whereby the energy is added to air to provide a supply of high pressure air to supply the combustors.

The following discussion is based upon the flow diagram of FIG. 4.

THE ENERGY CONTENT OF THE AIR FLOW

The function of the recirculation air flow is to impart energy to the induced air. The recirculation air flows through guide vanes or at the radius $Rt$ which is the torus generating circle radius. The blades are set at angle $\alpha$ and with respect to the tangent to the whorl circle along the generating circle at the blade trailing edges so that the radial velocity (around the generating circle or generatrix)

|  |  |
|---|---|
|  | $Vr = Vc \sin \alpha$ |
| whorl velocity $Vw$ | $= Vc \cos \alpha$ |
| The total pressure | $= Pc$ |
| The inlet pressure | $= Pi$ |
| Pressure ratio | $= \dfrac{Pc}{Pi}$ |

The gas flow pulls down the static pressure upstream and as the recirculation flow progresses in the low pressure zone sucks in the inlet air and increases the mass flow. Consequently the inlet air is given a rotational velocity.

In a mechanical comressor the rotational velocity is produced by the action of rotating blades whilst in the present invention the rotational velocity is imparted to the inlet air by the recirculating air, consequently the recirculating air simulates the action of a mechanical compressor.

The velocity $Vc = \sqrt{2gJ \Delta hc}$ where $\Delta hc$ is energy content per lb of recirculating air corresponding to the pressure $Pc$ and the pressure ratio $Pc/Pi$.

ANALYSIS OF THE AIR VELOCITY

The velocity $c$ has three components:

| | |
|---|---|
| Vcw | = whorl velocity |
| Vcr | = radial velocity |
| Vca | = axial velocity in the plane which is at right angle to the plane of whorl and therefore parallel to the axis of rotation |

$Vc = \sqrt{Vcw^2 + Vcr^2 + Vca^2}$
$Vcw = Vc \cos \alpha$ $(Vc \sin\alpha)^2 = Vcr^2 + Vcw^2$
$Vca = Vc \sin\alpha \sin\alpha$
$Vcr = Vc \sin\alpha \cos\alpha$ at the blade exit before the curved path begins $x = 0$ where $x$ is the angle of turn.

$$Vca = Vc \sin\alpha (\sin 0°) = O$$
$$Vcr = Vc \sin\alpha (\cos 0°) = Vc.\sin\alpha$$

after 90° turning i.e. when $x = 0$ $$Vca = Vc \sin\alpha \sin\alpha(90°) = Vc \sin\alpha$$
$$Vcr = Vc \sin\alpha \cos\alpha(90°) = O$$

after 90° turn there is a whorl velocity around the axis and vortex around the torus in a plane which is a right angle to the plane of whorl.

In this position the centrifugal forces due to the whorl and vortex around the torus are in opposite direction and must balance for the flow to the tangential.

LIMITATION OF MAXIMUM FLOW VELOCITY

The recirculation air is at the same total pressure as the combustion air supply pressure.

The radial velocity $Vr = Vc \sin\alpha$ and the whorl velocity $Vw = Vc \cos\alpha$ $$Vr = Vc \sin\alpha = a M$$

where
  $a$ = velocity of sound
  $M$ = Mach No.

In order to limit the radial velocity to sonnic value, $M = 1.0$ at the limit.
Therefore $$Vc = \sqrt{2gJ \Delta hc} = Vc \sin\alpha = a M; \quad Vc = \frac{a M}{\sin\alpha}$$

$$Vc^2 = \frac{a^2 M^2}{\sin\alpha^2}$$

$$2gJ \Delta hc = \frac{a^2 M^2}{\sin^2\alpha}$$

$$\Delta hc = \frac{a^2 M^2}{2gJ} \cdot \frac{1}{\sin^2\alpha} \text{ for } \begin{array}{l} M = 1.0 \\ a = 1120 \text{ ft/sec} \end{array}$$

$$\frac{a^2 M^2}{2gJ} = 25$$

$$= \frac{25}{\sin^2\alpha}$$

$$\sin\alpha = \sqrt{\frac{25}{\Delta hc}}$$

RELATIONSHIP OF GAS AND AIR VELOCITIES TO MASS FLOW $$VC = \sqrt{2gJ \Delta hc}$$

$$\ddot{W}g \frac{(Vgo^2 - Vgf^2)}{Vc \, gJ} = W \Delta hc$$

$$= \frac{Vc^2}{2gJ} W$$

$$\frac{Vgo^2 - Vgf^2}{Vc^2} = \frac{W}{Wg}$$

if $Vgf = 0$ $$\frac{Vgo}{Vc} = \sqrt{1 + \frac{W}{Wg}} \qquad Vc = \frac{Vgo}{\sqrt{1 + \frac{W}{Wg}}}$$

THE COMBUSTION PROCESS

As explained in the above-mentioned earlier Applications the combustion products flowing from one inductive combustion chamber nozzle depresses the pressure in the other combustion and consequently air flows in mixed with fuel.

The sudden change of cross-section in the combustion inlet causes the collection of residual hot gasses in the annular "dead water" region behind the inlet shoulders and the turbulent interpenetration of these gasses with incoming fresh charge increases the area of contact which causes an instantaneous rate of heat release and the combustion takes place intermittently even if the fuel is injected continuously.

The combustion chamber pressure required to stop the flow in the inlet duct is the hammer pressure corresponding to the initial conditions of this flow. Although the hammer pressure is higher than free stream stagnation pressure, nevertheless, the peak explosion pressure exceeds the hammer pressure, so that some reverse flow takes place in the inlet duct at the peak pressure.

If the individual combustion chamber inlet duct is long the reverse flow is kept from extending all the way to the end of this duct. However if the individual inlet duct length is shorter then a quantity of air can be caused to flow radially down into a vortex chamber as explained in my aforementioned Application so that this energy is added to an air vortex, in the common air inlet zone.

The products of combustion preferably flow through a damper or oscillation suppressor (FIG. 3). This is particularly necessary when inductive nozzles are not employed. The function of the damper is to suppress the pressure and velocity fluctuation. The suppressor is simply a reservoir which has a mass capacity at least several times greater than the cyclic fluid mass flowing into the damper.

The gasses flow directly or through a damper into a blade nozzle ring as already described. The gas nozzle ring may be constructed radially or axially, depending e.g. on the orientation of the combustion chambers relative to the axis X—X.

The blade angle setting for the radial position would be the same as the blade setting for recirculation air flow.

For axial flow the blade is set at an angle $\alpha$ with respect to the whorl plane as described.

IDEAL PERFORMANCE OF THE GAS GENERATOR

Turning to FIG. 5 various ideal parameters of the gas generator, based upon the preceding discussion have been plotted against the generator pressure ratio $Pc/Pa$ (or $Pc/Pi$) as a common base.

First of all it will be seen that very high temperatures may be employed in the combustion chambers, substantially higher than have been available hitherto. This is due to a number of factors. One is that since there is no turbomachinary and consequently there are no fragile turbine blades subjected to the high temperatures, this limitation upon the temperature ceiling is removed. The combustion chambers are substantially free of components which impose any limitation upon the maximum temperature and highly heat resistant materials may be used in the walls. Since furthermore, the weight of turbomachinery is rendered unnecessary heavier materials can be used providing the necessary heat resistance so that temperatures approaching those used in rocket engines may be contemplated. Indeed, the temperatures contemplated are those utilising conventional hydrocarbon fuel. Since hydrogen has a very much higher heat of combustion, even higher temperatures may be obtained using hydrogen as a fuel.

Again, although there is an absence of turbomachinery, a high pressure is nevertheless achieved at the inlet resulting in high combustion efficiency. Indeed it is anticipated, as shown in the thermal efficiency curve that efficiencies of 60% or higher are contemplated with a generator pressure ratio of between 9 and 10:1.

Contributing to the higher efficiency is the high combustor air inlet temperature which may be of the order of 1,000°R. This corresponds with an estimated exhaust temperature at the outlet of the combustion chambers of 2,500°R. Again this corresponds to a ratio of air flow to gas flow of the order of 2½:1. Similarly this will correspond to a blade angle $\alpha$, determining the toroidal flow, between 25° and 30°.

SCOPE OF THE INVENTION

It will be appreciated that while the embodiments described make use of my earlier inventions concerning pairs of combustion chambers arranged for mutual induction, the principle novelty of the present invention lies in the static or non-rotating means transferring energy from the high velocity exhaust gasses, to the intake air whereby a high intake pressure can be achieved and gas turbine operation is simulated. This invention therefore is not restricted to the use of pairs of mutually inductive combustion chambers nor to valveless combustion chambers. If desired a single combustion chamber may be used and may be operated as a pulse jet, utilising a conventional intake valve assembly and conventional scavenging means such as a tail pipe or equivalent resonance chamber. It is considered unnecessary to show a particular embodiment utilising such a system since a single pulse jet combustion chamber could take the place of the pair of combustion chambers in FIG. 3, the distance between the outlet and the oscillation suppression chamber being extended if necessary to produce the necessary scavenging effect. The intake valve assembly would naturally extend across the full width of the combustion chambers at the intake end including the shoulder regions and therefore be of generally cylindrical shape. Needless to say the single combustion chamber could also be arranged like one of the combustion chambers in FIG. 1 that is to state with a more predominantly axial direction or indeed with a completely axial orientation.

What I claim is:

1. A gas generator comprising:
   a plurality of annular combustion chambers arranged in at least one pair disposed on a common central axis,
   the combustion chambers of each pair being of the same volume, co-extensive and adjacent, having air inlets and exhaust outlets,
   a common annular air inlet passage leading to said air inlets of the combustion chambers of each said pair,
   a primary exhaust passage leading commonly from the exhaust outlets of the combustion chambers of each said pair,
   an exhaust duct communicating with said exhaust passage,
   fuel injection means and ignition means for each combustion chamber,
   means for operating at least one of said fuel injection means and ignition means of each pair of combustion chambers alternately at least during start-up whereby the paired combustion chambers operate in an alternate cycle,
   an air intake passage,
   means for transferring energy from high velocity exhaust gasses emitted by each pair of combustion chambers to cooler, lower velocity gas from said air intake passage so as to establish a combined gas stream of resultant energy,
   a secondary exhaust passage,
   means for separating part of said combined stream consisting substantially of combustion products into said secondary exhaust passage,
   a diffuser for collecting and diffusing part of said combined stream consisting substantially of air and conducting it to said air inlet passage of a said pair of combustion chambers whereby each air inlet passage receives high pressure air from a said diffuser,
   said combustion chambers of each pair converging directly and without individual scavenging means into said primary exhaust passage in the form of mutually inductive nozzles whereby the combustion chambers operate in pulses in alternate sequence with the ignition cycle in one chamber creating a reduced pressure in the other chamber thereby assisting the air intake.

2. A gas generator as claimed in claim 1 wherein said air inlets are valveless, said combustion chambers being shaped with a taper towards said exhaust outlet and a sharply expanded region near said inlet thereby restricting reverse flow of combustion products.

3. A gas generator as claimed in claim 1 wherein said energy transfer means includes means for establishing a helico-toroidal gas flow into which intake air is drawn and accelerated by the exhaust gasses from said combustion chamber pair.

4. A gas generator as claimed in claim 3 including means for directing the exhaust gasses helico-toroidally outwardly of said intake air downstream of the entry of said air to said gas flow so as to form a part-toroidal gas/air interface whereby the intake air is drawn in and pressure exchange takes place and the gas and air streams tend to equalize in velocity.

5. A gas generator as claimed in claim 4 wherein said energy transfer means includes an annular enclosure adjacent the exhaust passage of each combustion chamber pair, coaxial with the combustion chambers and part of which is generally co-extensive with the exterior wall of said exhaust passage and a closed toroid supported within said annular enclosure forming with said enclosure a toroidal chamber in which said helico-toroidal gas flow is established.

6. A gas generator as claimed in claim 5 wherein said toroidal chamber includes a circulating air/exhaust gas pressure-exchange zone adjacent said exhaust passage and a circulating gas/intake air mixing zone in a portion of the toroidal chamber angularly separated from said pressure exchange zone with respect to the toroid generatrix.

7. A gas generator as claimed in claim 6 wherein a plurality of units each comprising a combustion chamber pair and toroidal chamber are arranged with axial separation on said common axis, with a common air intake zone and exhaust duct.

8. A gas generator as claimed in claim 7 wherein the diffusor of one said unit leads to the inlet passage of a different unit.

9. A gas generator as claimed in claim 6 having a single pair of combustion chambers and a single toroidal chamber, said diffusor leading to the inlet passage of the said single pair of combustion chambers.

10. A gas generator as claimed in claim 6 including an oscillation suppression chamber located between said primary exhaust passage and said toroidal chamber.

11. A gas generator as claimed in claim 6 including an assembly of annular stator blades constituting the axially adjacent wall of said toroidal chamber for conducting intake air into said helico-toroidal air flow downstream of said diffuser inlet.

12. A gas generator as claimed in claim 6 wherein said stator blades have trailing edges which terminate at successively greater distances from said toroid, proceeding in the direction of the air flow about the generatrix.

13. A gas generator as claimed in claim 1 including a by-pass air duct and means for transferring energy from secondary exhaust gas in said secondary exhaust passage to accelerate said by-pass air and to provide a combined air/gas exhaust stream of increased mass flow.

14. A gas generator as claimed in claim 13 including means for directing said by-pass air into a helico-toroidal flow and means for directing said secondary exhaust gas helico-toroidally outwardly of said by-pass air downstream of said by-pass air directing means whereby the intake air is drawn in and pressure exchange takes place and the gas and air streams tend to equalize in velocity.

15. A gas generator as claimed in claim 14 wherein said by-pass energy transfer means includes an annular enclosure adjacent the exhaust passage of each combustion chamber pair, coaxial with the combustion chambers, and part of which is generally co-extensive with the exterior wall of said exhaust passage, and a closed toroid supported within said annular enclosure forming with said enclosure a toroidal chamber in which said helico-toroidal gas flow is established.

16. A gas generator as claimed in claim 15 wherein said by-pass air directing means includes an assembly of annular stator blades in the radially outward half of said toroidal chamber.

17. A gas generator as claimed in claim 16 wherein said stator blades have trailing edges which terminate at successively greater distances from said toroid, proceeding in the direction of the air flow about the generatrix.

18. A simulated gas turbine jet engine of subsonic and supersonic capability comprising:
a plurality of annular combustion chambers arranged in at least one pair disposed on a common central axis,
the combustion chambers of each pair being of the same volume, co-extensive and adjacent, having air inlets and exhaust outlets,
a common annular air inlet passage leading to said air inlets of the combustion chambers of each said pair,
a primary exhaust passage leading commonly from the exhaust outlets of the combustion chambers of each said pair,
an exhaust duct communicating with said exhaust passages,
fuel injection means and ignition means for each combustion chamber,
means for operating at least one of said fuel injection means and ignition means of each pair of combustion chambers alternately at least during start-up whereby the paired combustion chambers operate in an alternate cycle,
an air intake passage,
means for establishing a helico-toroidal gas flow into which intake air is drawn and accelerated by the exhaust gases from said combustion chamber pair including means for directing the exhaust gases helico-toroidally outwardly of said intake air downstream of the entry of said air to said gas flow so as to form a part-toroidal gas/air interface whereby the intake air is drawn in and pressure exchange takes place and the gas and air streams tend to equalize in velocity,
a secondary exhaust passage,
means for separating part of said combined stream consisting substantially of combustion products into said secondary exhaust passage,
a diffuser for collecting and diffusing part of said combined stream consisting substantially of air and conducting it to said air inlet passage of a said pair of combustion chambers whereby each air inlet passage receives high pressure air from a said diffuser,
said combustion chambers of each pair converging directly and without individual scavenging means into said primary exhaust passage in the form of mutually inductive nozzles whereby the combustion chambers operate in pulses in alternate sequence with the ignition cycle in one chamber creating a reduced pressure in the other chamber thereby assisting the air intake,
a by-pass duct leading by-pass air from an air intake region of the engine,
means for directing said secondary exhaust gas helico-toroidally outwardly of said by-pass air downstream of said by-pass air directing means whereby the intake air is drawn in and pressure exchange takes place and the gas and air streams tend to equalize in velocity,
an exhaust nozzle, and
an after burner unit positioned in said combined exhaust/by-pass air flow upstream of said nozzle.

19. A jet engine as claimed in claim 18 wherein said energy transfer means includes means for establishing a helico-toroidal gas flow into which intake air is drawn and accelerated by the exhaust gasses from said combustion chamber pair and including an oscillation suppression chamber located between said primary exhaust passage and said toroidal chamber.

20. A gas generator comprising:
at least one annular combustion chamber arranged around a central axis, and having an air inlet and exhaust outlet,
an air inlet passage leading to said air inlet, a primary exhaust passage leading from said exhaust outlet, fuel injection and ignition means for said combustion chamber, means associated with said combustion chamber whereby combustion gases are directed at least predominantly through said exhaust outlet, means for transferring energy from high velocity exhaust gases emitted by said combustion chamber to cooler, lower velocity gas from said air intake passage so as to establish a combined gas stream of resultant energy, said energy transfer means including an annular enclosure adjacent the exhaust passage of said combustion chamber, coaxial with said combustion chamber and part of which is generally coextensive with the exterior wall of said primary exhaust passage and a closed toroid supported within said annular enclosure forming with said enclosure a toroidal chamber in which a helico-toroidal gas flow is established, a second exhaust passage, means for separating part of said combined stream consisting substantially of combustion products into said secondary exhaust passage, a diffuser for collecting and diffusing part of said combined stream consisting substantially of air and conducting it to said air inlet passage of a said combustion chamber whereby each air inlet passage receives high pressure air from a said diffuser.

21. A gas generator as claimed in claim 20 wherein said combustion chamber is arranged to operate as a pulse jet, said gas generator including an intake valve assembly, scavenging means, and an oscillation suppression chamber downstream of said exhaust outlet and upstream of said energy transfer means.

22. A gas generator comprising:

at least one annular combustion chamber arranged around a central axis to operate as a pulse jet, and having an air inlet and exhaust outlet, an air inlet passage leading to said air inlet, a primary exhaust passage leading from said exhaust outlet, fuel injection and ignition means for said combustion chamber, means associated with said combustion chamber whereby combustion gases are directed at least predominately through said exhaust outlet, means for transferring energy from high velocity exhaust gases emitted by said combustion chamber to cooler, lower velocity gas from said air intake passage so as to establish a combined gas stream of resultant energy, a secondary exhaust passage, means for separating part of said combined stream consisting substantially of combustion products into said secondary exhaust passage, a diffuser for collecting and diffusing part of said combined stream consisting substantially of air and conducting it to said air inlet passage of a said combustion chamber whereby said air inlet passage receives high pressure air from a said diffuser, and an intake valve assembly, scavening means, and an oscillation suppression chamber downstream of said exhaust outlet and upstream of said energy transfer means.

* * * * *

UNITED STATES PATENT AND TRADEMARK OFFICE
CERTIFICATE OF CORRECTION

PATENT NO. : 3,925,981
DATED : December 16, 1975
INVENTOR(S) : Alexander Hossen Etessam It is certified that error appears in the above-identified patent and that said Letters Patent are hereby corrected as shown below:

Col. 1, line 32, change "described" to --describes--.

Col. 2, line 22, change "emitting" to --emitted--.

Col. 4, line 31, change "passage" to --passages--.

Col. 6, line 21, change "are" to --as--.

Col. 10, line 30, change "comressor" to --compressor--.

Col. 11, lines 54-55, change $$\ddot{W}g \frac{(Vgo^2 - Vgf^2)}{VcgJ}$$

to $$\ddot{W}g \frac{(Vgo^2 - Vgf^2)}{2gJ}$$

Col. 13, line 35, change "This" to --The--.

Signed and Sealed this eighteenth Day of May 1976

[SEAL]

Attest:

RUTH C. MASON
Attesting Officer

C. MARSHALL DANN
Commissioner of Patents and Trademarks